United States Patent
Zhou et al.

(10) Patent No.: US 7,365,525 B2
(45) Date of Patent: Apr. 29, 2008

(54) PROTECTION FOR SWITCHED STEP UP/STEP DOWN REGULATORS

(75) Inventors: Xunwei Zhou, San Jose, CA (US); Randy G. Flatness, Los Gatos, CA (US)

(73) Assignee: Linear Technology Corporation, Milpitas, CA (US)

(*) Notice: Subject to any disclaimer, the term of this patent is extended or adjusted under 35 U.S.C. 154(b) by 276 days.

(21) Appl. No.: 11/052,478

(22) Filed: Feb. 8, 2005

(65) Prior Publication Data
US 2006/0176037 A1    Aug. 10, 2006

(51) Int. Cl.
  *G05F 1/00*    (2006.01)
(52) U.S. Cl. ............... 323/282; 323/211; 323/222; 323/224; 323/284; 323/285
(58) Field of Classification Search ............. 323/211, 323/222, 224, 284, 285
See application file for complete search history.

(56) References Cited

U.S. PATENT DOCUMENTS

| | | | |
|---|---|---|---|
| 4,618,812 A * | 10/1986 | Kawakami ............... 323/224 |
| 5,001,621 A | 3/1991 | Egawa |
| 5,134,355 A * | 7/1992 | Hastings ............... 323/211 |
| 5,371,667 A * | 12/1994 | Nakao et al. ............ 363/124 |
| 5,481,178 A | 1/1996 | Wilcox et al. |
| 5,552,694 A | 9/1996 | Appeltans |
| 5,602,463 A | 2/1997 | Bendall et al. |
| 5,629,608 A * | 5/1997 | Budelman ............... 323/268 |
| 5,734,258 A | 3/1998 | Esser |
| 5,889,392 A | 3/1999 | Moore et al. |
| 6,087,816 A | 7/2000 | Volk |
| 6,127,815 A * | 10/2000 | Wilcox ............... 323/282 |
| 6,144,194 A * | 11/2000 | Varga ................ 323/285 |
| 6,166,527 A * | 12/2000 | Dwelley et al. ........... 323/222 |
| 6,191,567 B1 | 2/2001 | Sluijs |
| 6,215,286 B1 | 4/2001 | Scoones et al. |
| 6,275,016 B1 | 8/2001 | Ivanov |
| 6,348,779 B1 | 2/2002 | Sluijs |
| 6,411,531 B1 | 6/2002 | Nork et al. |
| 6,534,963 B2 * | 3/2003 | Bayer et al. .............. 323/313 |
| 6,580,253 B2 * | 6/2003 | Kanakubo et al. ........ 323/222 |
| 6,580,258 B2 | 6/2003 | Wilcox et al. |
| 6,636,431 B2 | 10/2003 | Seki et al. |
| 6,737,838 B2 | 5/2004 | Sluijs et al. |
| 6,765,371 B2 | 7/2004 | Kataoka |

(Continued)

OTHER PUBLICATIONS

Leyva-Ramos et al., "Modeling of Current-Programmed Converters with Inductor Current Sensing", IEEE, Sep. 2000.*

(Continued)

*Primary Examiner*—Jessica Han
*Assistant Examiner*—Emily P Pham
(74) *Attorney, Agent, or Firm*—McDermott Will & Emery LLP (57) ABSTRACT

A four switch voltage converter is regulated for buck mode and boost mode under constant frequency valley-peak current mode control. Protection circuits are responsive to output voltage and regulator current to prevent excessive current that otherwise might result from abnormally low output voltage short circuit, or spurious switching abnormalities during low duty cycle operation. The regulator control circuit is responsive to the protection circuits to automatically connect a regulator inductor between a common potential and the output to limit current.

26 Claims, 8 Drawing Sheets

U.S. PATENT DOCUMENTS

| | | |
|---|---|---|
| 6,781,352 B2 | 8/2004 | Athari et al. |
| 6,812,676 B2 | 11/2004 | Tateishi |
| 6,859,020 B2 | 2/2005 | Baldwin et al. |
| 6,977,488 B1 | 12/2005 | Nogawa et al. |
| 6,984,967 B2 | 1/2006 | Notman |
| 2002/0145409 A1 | 10/2002 | Umminger et al. |
| 2004/0085048 A1 | 5/2004 | Tateishi |
| 2004/0239299 A1 | 12/2004 | Vinciarelli |
| 2005/0195622 A1 | 9/2005 | Lehman et al. |
| 2006/0055384 A1 | 3/2006 | Jordan et al. |

OTHER PUBLICATIONS

Maxim Step-Up/Step-Down Li+ Battery Charger, Maxim Integrated Products, MAX1870 A, pp. 1-32.

Redl, Richard., et al. "What a Design Engineer Should Know About Current-Mode Control." Design Automation Inc. pp. 18-33.

"Modeling, Analysis and Compensation of the Current-Mode Converter," Unitrode Application Note, U-97, Applications Handbook 1997 Edition, pp. 3-43-3-48.

"Micropower Synchronous Buck-Boost DC/DC Converter." Linear Technology, LTC3440, pp. 1-16.

"No $R_{SENSE}$ Synchronous Step-Up DC/DC Controller." Linear Technology, LTC1700, pp. 1-16.

"High Efficiency Synchronous Step-Down Switching Regulator." Linear Technology, LTC1735, pp. 1-32.

"Wide Operating Range No $R_{SENSE}$™ Step-Down Controller." Linear Technology, LTC1778/LTC1778-1, pp. 1-24.

Linear Technology, "LTC3760—High Efficiency, Synchronous, 4-Switch Buck-Boost Controller", pp. 1-28, XP-002422285, Linear Technology Corporation.

European Search Report issued in corresponding European Patent Application No. EP 06 25 0659, dated Mar. 15, 2007.

\* cited by examiner

PROTECTION FOR SWITCHED STEP UP/STEP DOWN REGULATORS

RELATED APPLICATIONS

This application contains subject matter related to copending U.S. application Ser. No. 11/052,480 of Flatness et al., filed Feb. 8, 2005, copending U.S. application Ser. No. 11/052,477 of Flatness et al., filed Feb. 8, 2005, and copending U.S. application Ser. No. 11/052,473 of Flatness et al., filed Feb. 8, 2005, all commonly assigned with the present application. The disclosures of these applications are incorporated by reference herein.

TECHNICAL FIELD

The present disclosure relates to control of regulators, more particularly to providing protection for switched regulators operating in buck and boost modes.

BACKGROUND

Voltage regulators are known that can convert from input voltages above, below, or equal to controlled output voltages, respectively performing buck mode regulation, boost mode regulation, or buck-boost mode regulation. Regulator architecture typically is provided for power supplies for automotive applications, lap-top computers, telecom equipment and distributed power systems. A known "four-switch" buck-boost converter is described in an October 2001 datasheet for the LTC3440 "Micro-power Synchronous Buck-Boost DC/DC Converter" integrated circuit manufactured by Linear Technology Corporation. Two of the four switches are connected to the input side of an inductor, the other switches connected to the output side. In accordance with the level of voltage output to be controlled and the level of voltage input, the regulator has the capability of assuming a plurality of operation states in which the switches variously are sequentially activated or deactivated, to connect the inductor to the input, the output, and/or a common potential.

The aforementioned copending Flatness et al. application 11/052,480 describes a four switch regulator that operates at a constant clock frequency, the switches controlled in a peak current mode in boost operation and a valley current mode in buck operation. A single current sensing element provides input to a control circuit, the input indicative of current in the regulator inductor. The switches are controlled in response to this input to configure connection of the inductor to regulate output voltage. The sensing element dissipates current only during a portion of the control cycle, thereby conserving power.

Figure 1:
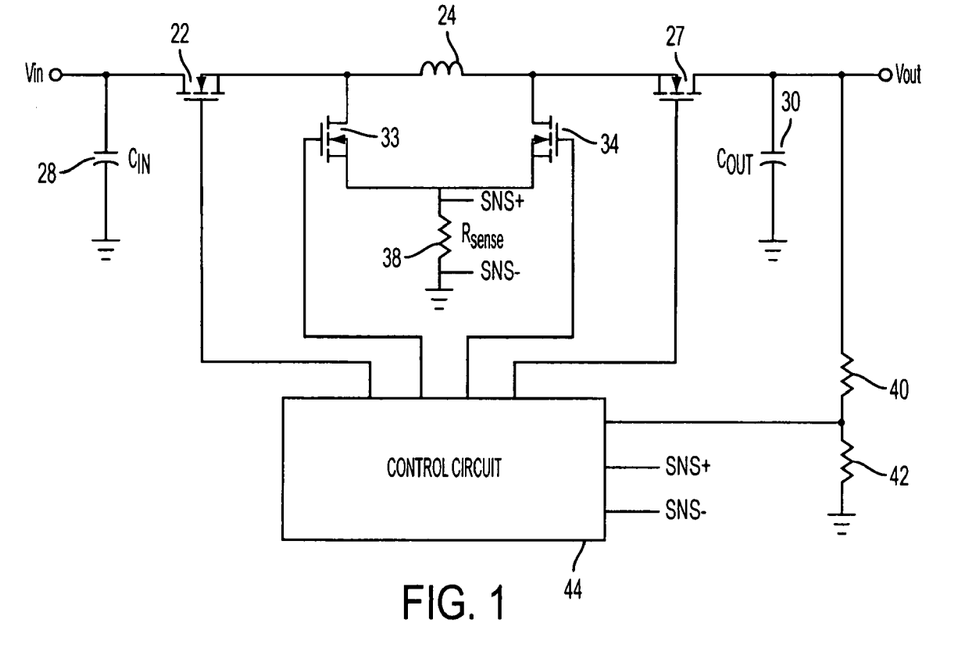
FIG. 1 is a schematic block diagram of a switching regulator for use in the present invention.

The switching regulator is exemplified in the schematic block diagram of FIG. 1. An input voltage from a power source is applied to input terminal $V_{in}$. A preset output voltage is regulated at the $V_{out}$ terminal. Connected in series between the input and output terminals are a first switch 22, inductor 24, and a second switch 27. Switches 22 and 27 preferably are MOSFETs, although any controlled switching device may be utilized.

An input capacitor 28 is connected between the input terminal and the common potential. An output capacitor 30 is connected between the output terminal and the common potential. Switch 33 and switch 34 are connected across inductor 24 and joined at node 36. Current sense resistor 38 is connected between node 36 and the common potential. Voltage divider resistors 40 and 42 are connected in series between the output terminal and the common potential.

Control circuit 44 has a first input connected to the junction between resistors 40 and 42, thereby to receive an output feedback voltage at resistor 42. The voltage at resistor 42 is proportional to the output voltage. A second input to control circuit 44 receives the voltage across resistor 38, which represents sensed inductor current. In response to these inputs, the control circuit 44 outputs signals for activation and deactivation of switches 22, 27, 33 and 34 for the various modes of operation. Switches 22 and 33 are controlled to be in reciprocal conductive states with respect to each other and switches 27 and 34 are controlled to be in reciprocal conductive states with respect to each other.

Figure 2:
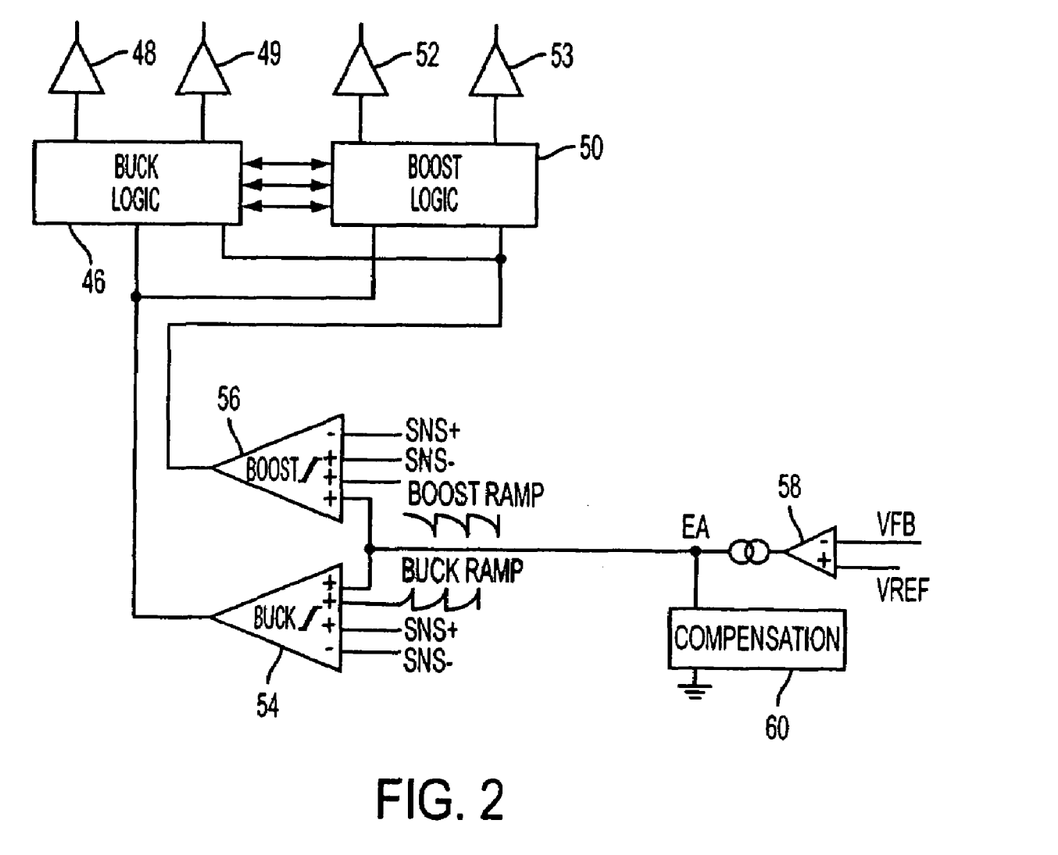
FIG. 2 is a block diagram of a current mode control circuit for the regulator of FIG. 1.

FIG. 2 is a block diagram of the control circuit 44 of FIG. 1. Buck logic circuit 46 outputs signals to switch drivers 48 and 49 that apply driving signals, respectively, to switches 22 and 33. Boost logic circuit 50 outputs signals to switch drivers 52 and 53 that apply driving signals, respectively, to switches 34 and 27. An output of buck comparator 54 is connected to an input of buck logic circuit 46 and an input of boost logic 50. An output of boost comparator 56 is connected to an input of buck logic circuit 46 and an input of boost logic 50.

Error amplifier 58 outputs a signal corresponding to the difference between the output feedback voltage, taken at the junction between resistors 40 and 42, and a reference voltage. This difference signal is applied as an input to buck comparator 54 and boost comparator 56. A buck compensation ramp signal and a boost compensation ramp signal are applied, respectively, to an input of the buck comparator 54 and the boost comparator 56. A compensation circuit 60 is shown connected to the error amplifier output. The compensation circuits may comprise a well-known resistive capacitive arrangement for this purpose, as described, for example, in an article entitled *Modelling, Analysis and Compensation of the Current-Mode Converter*, published in the 1997 edition of Applications Handbook. The compensation signal and difference signal are superimposed and compared by the comparators with the sensed current signal SNS+ SNS−, taken across current sense resistor 38 and applied as additional inputs to the comparators.

In buck mode operation, the output voltage is regulated to a preset level that is lower than the input voltage. To maintain the preset output voltage, current is applied by the regulator to the output capacitor $C_{OUT}$ at a rate that is controlled in dependence upon sensed conditions. Buck logic circuit 46 outputs signals for turning on and off switches 22 and 33 in response to the output of buck comparator 54, while boost logic circuit 50 maintains switch 34 off. Boost comparator 56 is disabled at this time. Buck mode operation is implemented with clocked constant frequency switching control. During each cycle, the inductor is first connected between the common potential and the output terminal and thereafter connected between the input terminal and output terminal.

In boost mode operation, the output voltage is regulated to a preset level that is higher than the input voltage. Switch 22 is ideally maintained in an on state throughout the boost mode operation by buck logic circuit 46. Switch 33 is maintained in an off state throughout the boost mode operation. Buck comparator 54 is disabled throughout boost mode operation. Boost logic circuit 50 outputs signals for turning on and off switches 34 and 27 in response to the output of boost comparator 56. During each cycle, the inductor is first connected between the input terminal and common potential and thereafter connected between the input terminal and output terminal.

In each of the buck and boost operating modes, when inductor 24 is connected between the input and output terminals in each cycle, the current sense resistor 38 is disconnected from the inductor by switches 33 and 34 in their off states. During this time, there is no sensed inductor current signal input to the control circuit 44. If a short circuit condition at the output were to occur, abnormal current surges can result.

Figure 3:
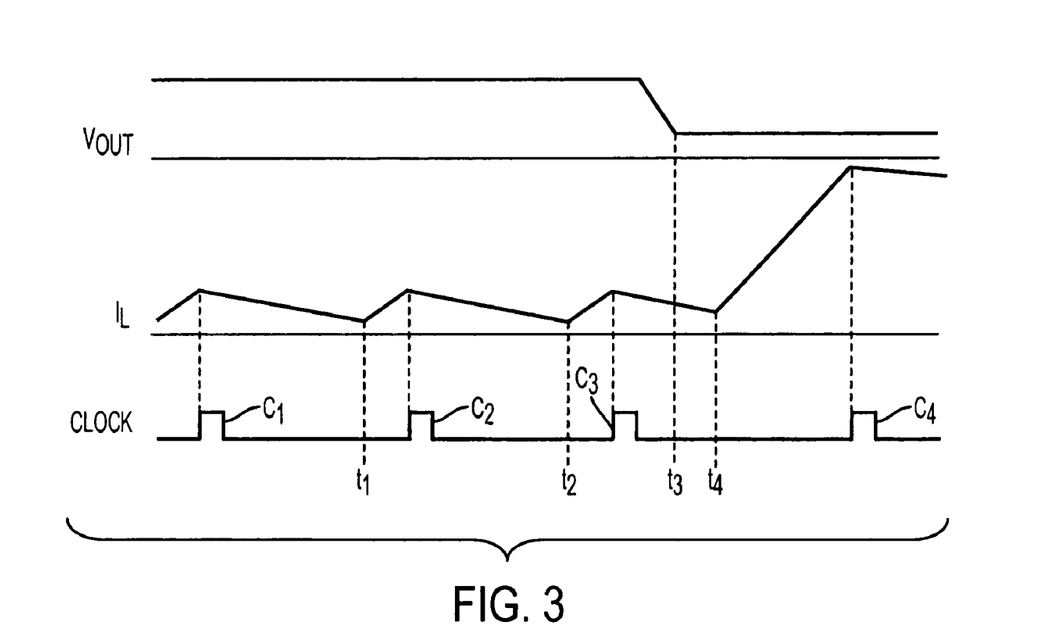
FIG. 3 is a waveform diagram that illustrates current surge when an output short circuit occurs during buck mode operation.

FIG. 3 is a waveform diagram that illustrates current surge when an output short circuit occurs during buck mode operation. Waveform $I_L$ represents current in inductor 24. Waveform $V_{OUT}$, which depicts the voltage at the output terminal, indicates that an output short circuit condition occurs after the third clock pulse $C_3$. Prior to the third clock pulse, normal controlled buck mode operation takes place. At the onset of clock pulses $C_1$ and $C_2$, inductor 24 is connected between the common potential and the output terminal via switches 33 and 27. Current is sensed by resistor 38. At times $t_1$ and $t_2$, inductor current has fallen to the valley threshold and control circuit 44 outputs signals to reconnect inductor 24 between the input terminal and the output terminal via switches 22 and 27 for the remainder of each clock cycle. As the valley threshold is reached relatively late in each cycle, the inductor is connected to the input terminal for a relatively small portion of the cycle.

Shortly after clock $C_3$, at $t_3$, a short circuit output condition occurs. As switches 33 and 27 are conductive at this time, very low voltage is applied across inductor 24. The charge stored in the inductor decreases at a significantly faster rate than during normal conditions. The valley threshold is reached early in the cycle, at $t_4$. Control circuit 44 then outputs control signals to connect inductor 24 between the input and output terminals via switches 22 and 27. These switch states remain into the next clock pulse, $C_4$. As switch 22 has been turned on much earlier in the cycle than normal, the inductor current has surged to a very high value.

Figure 4:
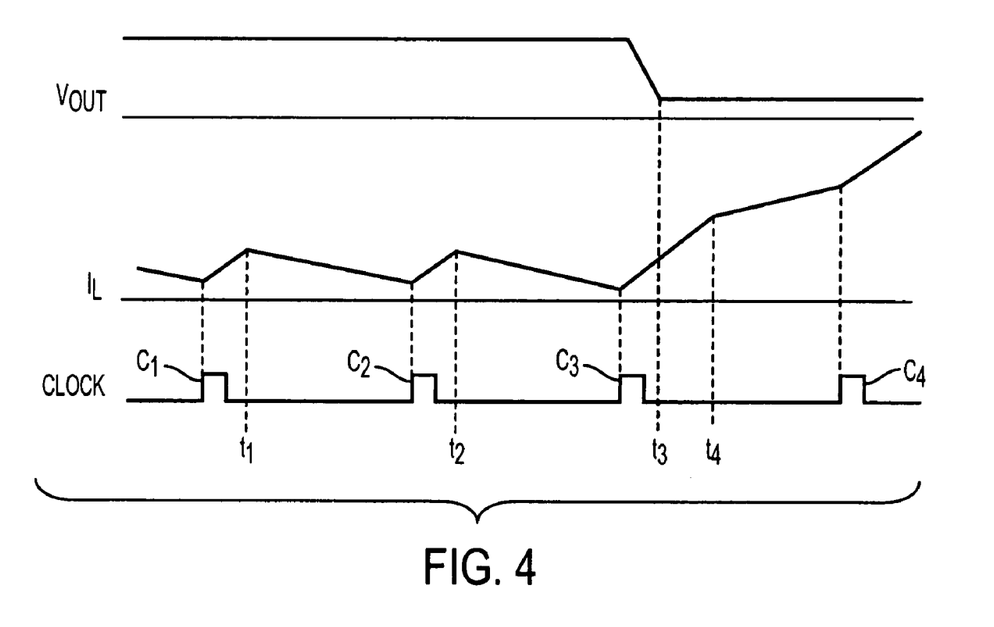
FIG. 4 is a waveform diagram that illustrates current surge when an output short circuit occurs during boost mode operation.

FIG. 4 is a waveform diagram that illustrates current surge when an output short circuit occurs during boost mode operation. Waveform $I_L$ represents current in inductor 24. Waveform $V_{OUT}$, which depicts the voltage at the output terminal, indicates that an output short circuit condition occurs after the third clock pulse $C_3$. Prior to the third clock pulse, normal controlled boost mode operation takes place. At the onset of clock pulses $C_1$ and $C_2$, inductor 24 is connected between the input terminal and the common potential via switches 22 and 34. Current is sensed by resistor 38. At times $t_1$ and $t_2$, inductor current has risen to the peak threshold and control circuit 44 outputs signals to reconnect inductor 24 between the input terminal and the output terminal via switches 22 and 27 for the remainder of each clock cycle. As the voltage at the output is higher than the voltage at the input, current decreases. The peak threshold is reached relatively early in each cycle, the inductor current increasing for a relatively small portion of the cycle.

Shortly after clock $C_3$, at $t_3$, a short circuit output condition occurs. Switches 22 and 34 are conductive at this time and inductor current is sensed. At $t_4$, the peak threshold is reached and control circuit 44 then outputs control signals to connect inductor 24 between the input and output terminals via switches 22 and 27. However, as a short circuit condition exists at the output and the voltage at the output now is much lower than the voltage at the input, current through inductor 24 continues to increase to a very high level. At clock $C_4$, inductor 24 is reconnected between the input terminal and the common potential and current continues to increase.

A need thus exists for protection of the regulator in both constant frequency valley current buck mode operation and constant frequency peak current boost mode operation.

Figure 5:
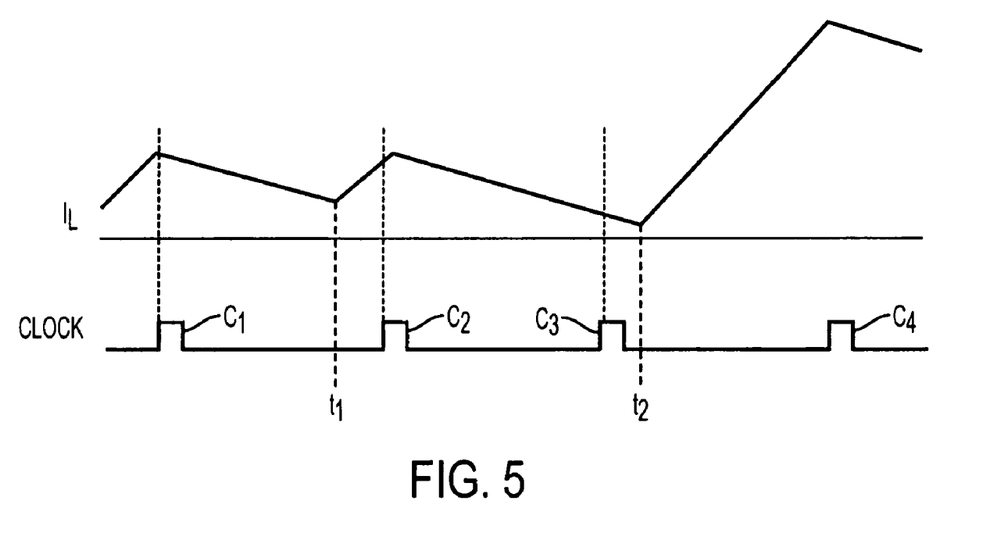
FIG. 5 is a waveform diagram that illustrates current surge when the control circuit does not respond in a cycle, during buck mode operation, to disconnect the input terminal from the regulator inductor.

The possibility of a large inductor current spike when the regulator is operating in a low duty cycle buck mode is an additional concern. FIG. 5 is a waveform diagram that illustrates such problem when the control circuit does not respond during a cycle due, for example, to occurrence of a noise signal. Waveform $I_L$ represents current in inductor 24. Normal buck mode operation occurs during the first cycle, starting at $C_1$. The current valley threshold is sensed at $t_1$, and the inductor is connected between the input and output terminals for the remainder of the cycle. As the voltage at the output is significantly less than the voltage at the input, the time during which the inductor is connected to the input terminal is a small portion of the clock cycle (i.e., low duty cycle operation).

During the second cycle, beginning at clock $C_2$, the control circuit has failed to reconnect the inductor between the input and output terminals and current continued to decrease for the whole cycle. In the cycle beginning at clock $C_3$, the valley threshold is sensed early in the cycle at $t_2$. Switches are then activated by the control circuit 44 to connect inductor 24 between the input and output terminals for the remainder of the cycle. Inductor current then increases without control to an abnormally high level.

The need thus exists for on-time limitation protection to prevent inductor current spike during a soft start or other fault conditions, such as soft short, in buck mode operation.

SUMMARY OF THE DISCLOSURE

The subject matter described herein fulfills the above-described needs of the prior art. In one aspect, protection is provided against the occurrence of short circuit current surge during buck mode operation. During constant frequency valley current mode control, an inductor is connected between a common potential and an output terminal in response to each clock signal pulse and the inductor current is sensed. When inductor current falls to the valley threshold, the inductor is connected between the input and output terminals. During the time when the inductor is connected to the input, a voltage related to the voltage at the output terminal is sensed. From this sensed voltage, determination is made as to whether an abnormal output voltage condition, such as low level or short circuit, occurs. If so, the inductor is reconnected between the common potential and the output prior to the next clock signal pulse.

An output feedback voltage is subtracted from a first voltage reference, the resultant voltage adjusted in accordance with clock frequency to obtain an adjusted resultant current. The adjusted resultant current is applied to charge a capacitor. The voltage at the capacitor is compared with a second reference voltage. If the capacitor voltage exceeds the second reference voltage, a signal is applied to effect reconnection of the inductor between the common potential and the output terminal. The capacitor is discharged when the inductor is not connected between the input and the output.

In another aspect, protection is provided against the occurrence of short circuit current surge during boost mode operation. During constant frequency peak current mode control, an inductor is connected between an input terminal and a common potential in response to each clock signal pulse and the inductor current is sensed. When inductor current rises to the peak threshold, the inductor is connected between the input and output terminals and a voltage related to the voltage at the output terminal is sensed. From this sensed voltage, determination is made as to whether an abnormal output voltage condition, such as low level or short circuit, occurs. If so, the inductor is connected between the common potential and the output terminal prior to the next clock signal pulse.

An output feedback voltage is subtracted from a first voltage reference, the resultant voltage adjusted in accordance with clock frequency to obtain an adjusted resultant current. The adjusted resultant current is applied to charge a capacitor. The voltage at the capacitor is compared with a second reference voltage. If the capacitor voltage exceeds the second reference voltage, a signal is applied to effect connection of the inductor between the common potential and the output terminal. The capacitor is discharged when the inductor is not connected between the input and the output.

In yet another aspect, an on-time limitation protection is provided during buck mode control to avoid excessive inductor current during startup and low duty cycle operation. A voltage level related to the regulator duty cycle and switching frequency is sensed when the inductor is connected between input and output terminals. The voltage level is adjusted in accordance with clock frequency to obtain an adjusted resultant current. The adjusted resultant current is applied to charge a capacitor. The voltage at the capacitor is compared with a reference voltage. If the capacitor voltage exceeds the reference voltage, a signal is applied to effect connection of the inductor between the common potential and the output terminal for the remainder of the cycle. The capacitor is discharged when the inductor is not connected between the input and the output. The time during a clock cycle in which the inductor is connected to the input thus is limited.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 6:
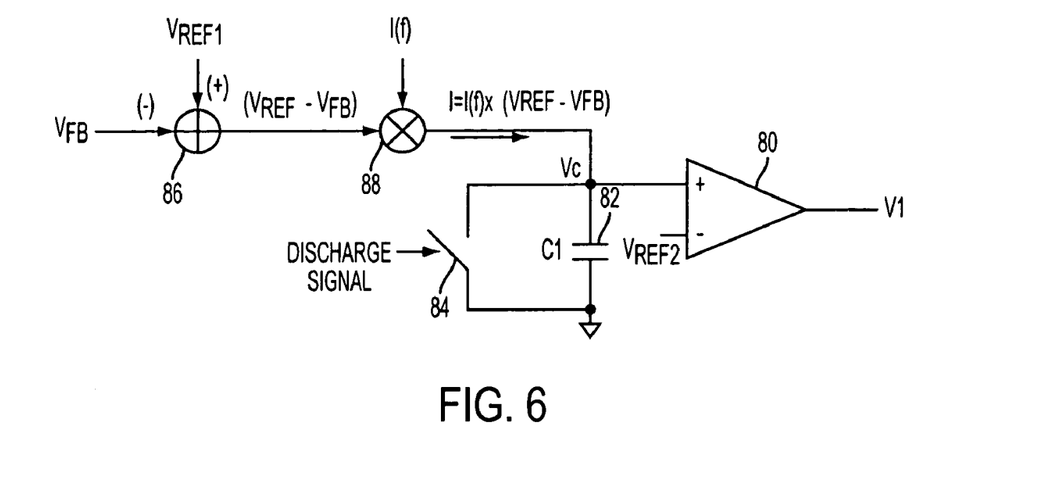
FIG. 6 is a block diagram of a circuit for protection of the regulator of FIGS. 1 and 2 against short circuit conditions in both buck mode and boost mode operation in accordance with the present invention.

FIG. 6 is a block diagram of a protection circuit for the regulator of FIG. 1 during both buck mode and boost mode operations. Comparator 80 has a first input connected to receive voltage signal $V_c$, the voltage across capacitor (C1) 82. A second input of comparator 80 receives reference voltage $V_{REF2}$. The comparator generates an output signal V1. Connected across capacitor 82 is switch 84, represented schematically. Control circuit 44 generates a discharge signal, which is applied to switch 84 to discharge capacitor 82, when switch 22 is set to an open state.

Adder 86 has a first input that receives a reference voltage $V_{REF1}$ and a second input that receives feedback voltage $V_{FB}$. The feedback voltage may be taken, for example, from the junction of resistors 40 and 42 of FIG. 1. This voltage is fed to adder 86 with negative polarity so that the output of the adder represents the difference between $V_{REF1}$ and $V_{FB}$. This output is applied to one input of multiplier 88. A second input of the multiplier receives a signal I(f) that is proportional to the clock frequency. The output of multiplier 88, $I(f) \times (V_{REF1} - V_{FB})$, is a current that represents the adder 86 output voltage adjusted for clock frequency. The current output by multiplier 88 is applied to charge capacitor 82 when inductor 24 is connected between the input terminal and the output terminal. When the inductor is not so connected, a discharge signal is applied to switch 84 to discharge capacitor 82.

Figure 7:
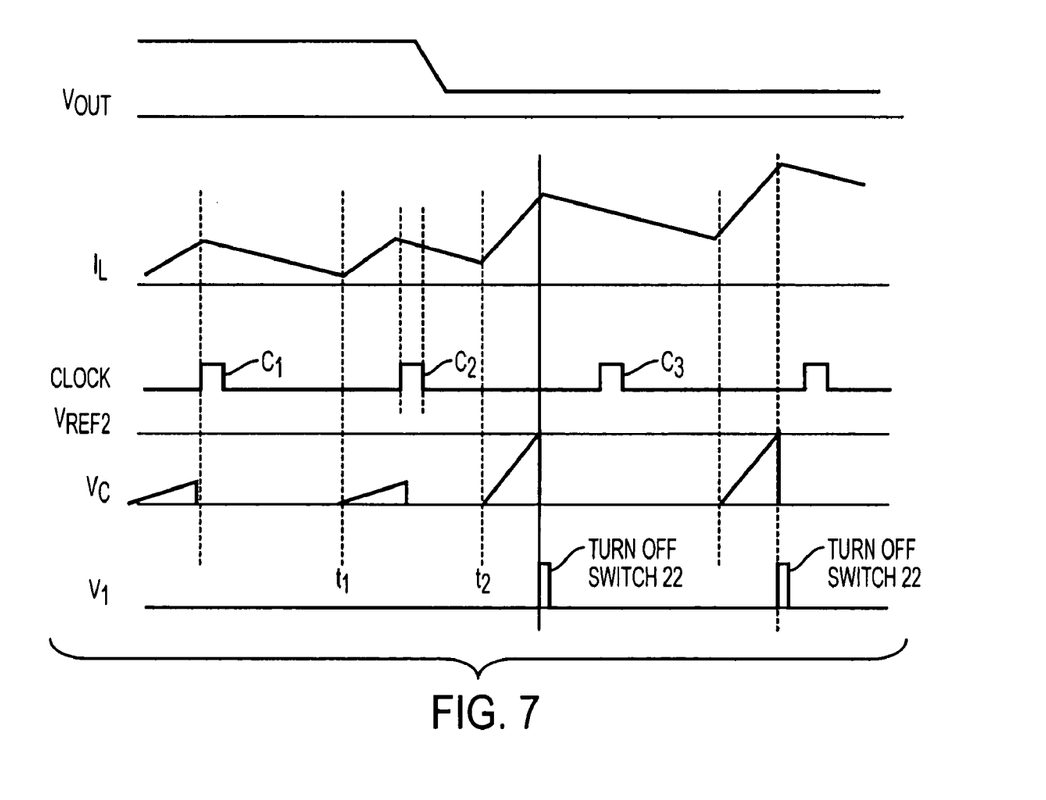
FIG. 7 is a waveform diagram for buck mode operation with protection provided by the circuit of FIG. 6.

FIG. 7 is a waveform diagram for illustrating buck mode operation of the regulator with protection provided by the circuit of FIG. 6. Waveforms of the output voltage $V_{OUT}$, inductor current $I_L$, the clock signal, $V_{REF2}$, capacitor 82 voltage $V_C$, and comparator output V1 are illustrated.

Normal operation takes place during the first clock cycle, initiated by clock pulse $C_1$. The inductor is first connected between the common potential and the output terminal, via switches 33 and 27, until the sensed current falls to the valley threshold, at $t_1$. At this time, which occurs relatively late in the cycle, the inductor is connected between the input terminal and the output terminal, via switches 22 and 27, and switch 84 is open. With the output voltage at normal level, as indicated by waveform $V_{OUT}$, capacitor 82 is charged at a low rate that is insufficient to reach $V_{REF2}$ before the end of the cycle.

Clock pulse $C_2$ starts the next cycle, whereupon the inductor is again connected between the common potential and the output terminal, and a discharge signal is applied to close switch 84 to discharge capacitor 82. As indicated by waveform $V_{OUT}$, an output short circuit condition occurs early in the cycle. As the voltage has fallen sharply, the inductor current decreases at a faster than normal rate and falls to the valley threshold at $t_2$. In response, the control circuit generates signals to connect the inductor between the input terminal and the output terminal and to open switch 84. As there is now a substantial difference between $V_{REF1}$ and $V_{FB}$, capacitor 82 charges at a fast rate. When the capacitor voltage $V_C$ reaches reference level $V_{REF2}$, comparator 80 outputs a signal pulse at V1, which is applied to the control circuit 44 to turn off switch 22 and turn on switch 33 to reconnect the inductor between the common potential and the output terminal. The inductor will remain so connected until the sensed current falls to the valley threshold. Excessively high current is thus avoided.

Figure 8:
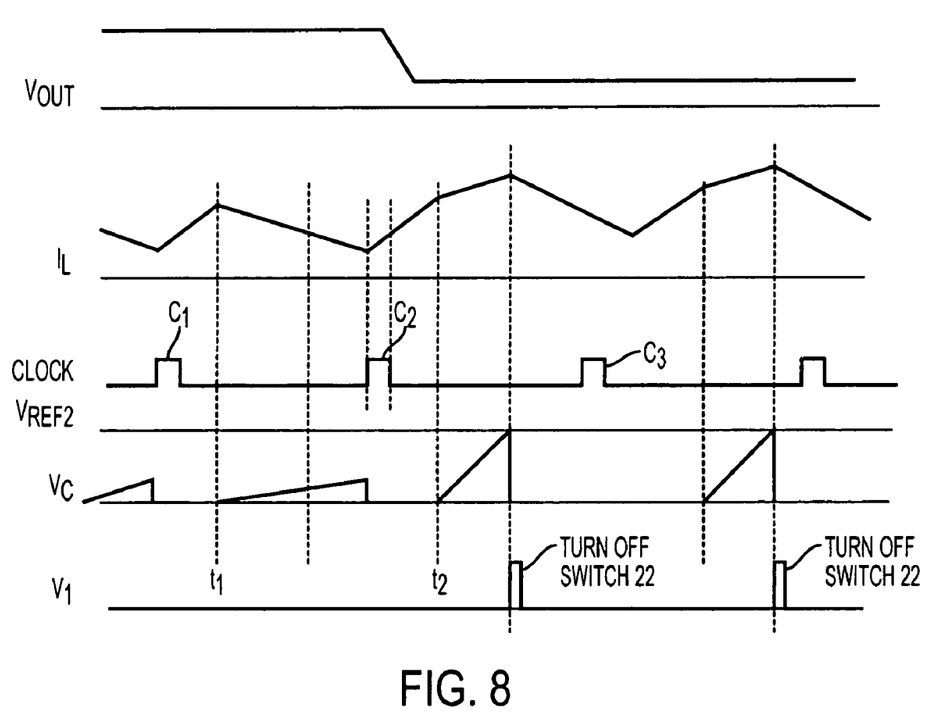
FIG. 8 is a waveform diagram for boost mode operation with protection provided by the circuit of FIG. 6.

FIG. 8 is a waveform diagram for illustrating boost mode operation of the regulator with protection provided by the circuit of FIG. 6. Waveforms of the output voltage $V_{OUT}$, inductor current $I_L$, the clock signal, $V_{REF2}$, capacitor 82 voltage $V_C$, and comparator output V1 are illustrated.

Normal operation takes place during the first clock cycle, initiated by clock pulse $C_1$. The inductor is first connected between the input terminal and the common potential, via switches 22 and 34, until the sensed current rises to the peak threshold, at $t_1$. At this time, switch 34 is turned off and switch 27 is turned on to connect the inductor between the input terminal and the output terminal. Switch 84 is now open. With the output voltage at normal level, as indicated by waveform $V_{OUT}$, capacitor 82 is charged at a low rate that is insufficient to reach $V_{REF2}$ before the end of the cycle.

Clock pulse $C_2$ starts the next cycle, whereupon the inductor is again connected between the input terminal and the common potential, and a discharge signal is applied to close switch 84 to discharge capacitor 82. As indicated by waveform $V_{OUT}$, an output short circuit condition occurs early in the cycle. As the voltage has fallen sharply, the inductor current increases at a faster than normal rate and rises to the peak threshold at $t_2$. In response, the control circuit generates signals to connect the inductor between the input terminal and the output terminal and to open switch 84. As there is now a substantial difference between $V_{REF1}$ and $V_{FB}$, capacitor 82 charges at a fast rate. When the capacitor voltage $V_C$ reaches reference level $V_{REF2}$, comparator 80 outputs a signal pulse at V1, which is applied to the control circuit 44 to turn off switch 22 and change operation, at least temporarily, to a buck mode in which the inductor is connected between the common potential and the output terminal via switches 33 and 27. At the next clock pulse, $C_3$, operation again begins in boost mode and control continues in the same manner. Inductor current is thus controlled to avoid excessively high levels. As an alternative, control can remain in buck mode operation until the short circuit condition is corrected.

Figure 9:
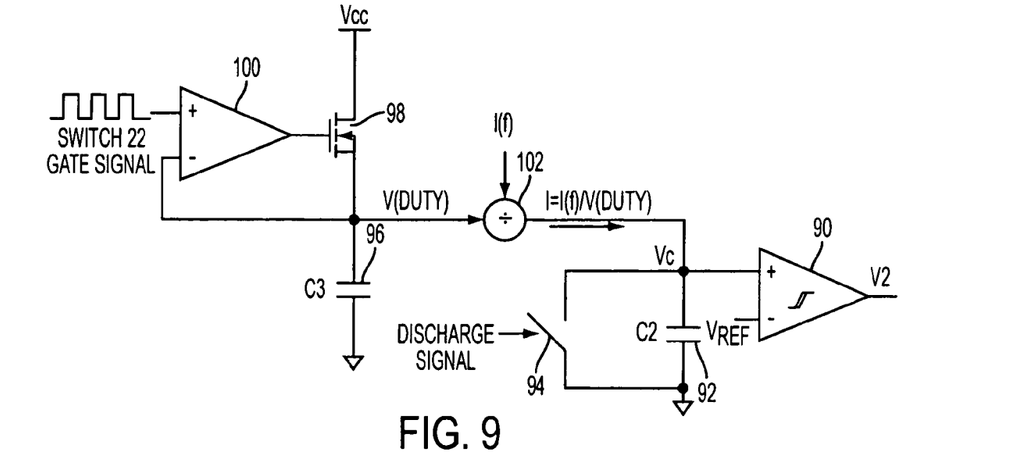
FIG. 9 is a block diagram of a circuit for protection of the regulator of FIGS. 1 and 2 against excessive inductor current during startup and low duty cycle during buck mode operation.

FIG. 9 is a block diagram of a circuit for protection of the regulator of FIGS. 1 and 2 against excessive inductor current during startup and low duty cycle buck mode operation. Comparator 90 has a first input connected to receive voltage signal $V_C$, the voltage across capacitor ($C_2$) 92. A second input of comparator 90 receives reference voltage $V_{REF}$. The comparator generates a pulse signal at output V2 when $V_C$ exceeds $V_{REF}$.

Connected across capacitor 92 is switch 94, represented schematically. Control circuit 44 generates a discharge signal, which is applied to switch 94 to discharge capacitor 92, when either of switches 33 and 34 is set to a closed state.

Capacitor (C3) is coupled to source $V_{CC}$ through controlled switch 98. Connected to the gate terminal of switch 98 is the output of operational amplifier 100. Applied to the non-inverting input of operational amplifier 100 is a signal timed with the switching signal applied by the control circuit 44 to switch 22. Switch 98, thus, is activated at a duty cycle rate that is related to the duty cycle of switch 22 to apply charge to capacitor 96. The voltage at capacitor 96, V(DUTY), is proportional to the regulator duty cycle. Capacitor 96 is connected to one input of divider 102. A second input of the divider receives a signal I(f) that is proportional to the clock frequency. The output of divider 100 is connected to capacitor 92 to provide charge current thereto.

If the regulator operates normally at high duty cycle, switch 22 is on for a relatively long time, V(DUTY) is relatively high, and the capacitor charge current is relatively low. At a relatively low duty cycle, switch 22 on time is relatively short, V(DUTY) is relatively high, and the capacitor charge current is relatively high. If the turn on time of switch 22 for some reason becomes abnormally long, the high capacitor charge current can charge capacitor 92 to a $V_C$ level that reaches $V_{REF}$.

Figure 10:
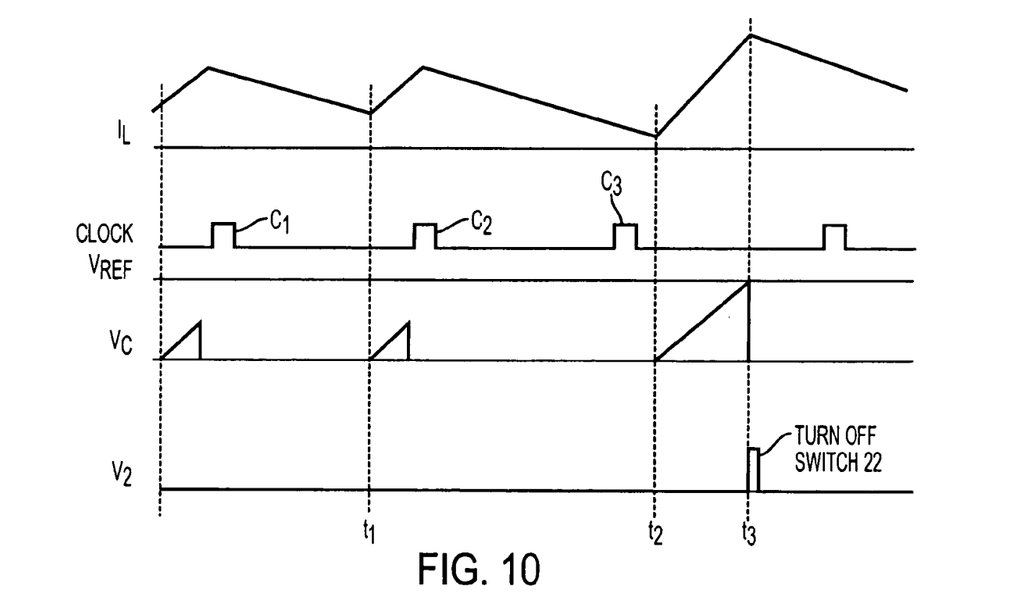
FIG. 10 is a waveform diagram for buck mode operation with protection provided by the circuit of FIG. 9.

FIG. 10 is a waveform diagram for buck mode operation of the regulator with protection provided by the circuit of FIG. 9. Waveforms of the inductor current $I_L$, the clock signal, $V_{REF}$, capacitor 92 voltage $V_C$, and comparator output V2 are illustrated.

Normal operation takes place during the first clock cycle, initiated by clock pulse $C_1$. The inductor is first connected between the common potential and the output terminal, via switches 33 and 27, until the sensed current falls to the valley threshold, at $t_1$. At this time the inductor is connected between the input terminal and the output terminal, via switches 22 and 27 and remains in this configuration until the next clock pulse. Switch 84 is open during this time. The on time of switch 22 is relatively short. At this low duty cycle operation, the charging current of capacitor 92 is relatively high. $V_C$ does not reach $V_{REF}$ level before the next clock pulse C2. No pulse has been output at V2.

Clock $C_2$ starts the next cycle, whereupon the inductor is again connected between the common potential and the output terminal via switches 33 and 27, and a discharge signal is applied to close switch 84 to discharge capacitor 82. The inductor current decreases. Due to a spurious abnormality, however, control has failed to reconnect the inductor between the input and output terminals when the current falls to the valley threshold or below. Inductor continues to fall for the remainder of the cycle.

Soon after the next clock pulse, C3, the control circuit 44 senses that the inductor current is below the valley threshold. At time $t_2$, signals are output to connect the inductor between the input terminal and the output terminal, via switches 22 and 27. Switch 94 is opened to allow charge current to be applied to capacitor 92. As $t_2$ occurs early in the clock cycle, $V_C$ reaches the $V_{REF}$ level at time $t_3$ and a pulse is output at V2. In response, the control circuit 44 generates output signals to reconnect the inductor between the common potential and the output terminal via switches 33 and 27. Switch 22 is turned off and switch 94 is closed to discharge capacitor 92. The inductor current decreases until the next clock pulse. Normal operation continues thereafter. The rise in inductor current has been kept to a safe level, thus limiting inductor current.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A method for protecting a step-up/step-down regulator circuit during buck mode operation at a constant clock frequency in which a preset voltage at an output is less than voltage at an input, the method comprising:
    connecting an inductor between a common potential and the output in response to each clock signal pulse received;
    sensing current in the inductor when it is connected to the common potential;
    in response to the sensed inductor current falling to a current valley threshold level, connecting the inductor between the input and the output;
    sensing a voltage related to the voltage at the output when the inductor is connected to the input; and
    reconnecting the inductor between the common potential and the output prior to a next clock signal pulse in response to occurrence of an output voltage condition during the voltage sensing step.

2. A method as recited in claim 1, wherein the output voltage condition is a low voltage level.

3. A method as recited in claim 1, the sensed output voltage condition is a short circuit.

4. A method as recited in claim 1, wherein
    the sensing step comprises subtracting an output feedback voltage from a first voltage reference to obtain a resultant voltage; and
    the reconnecting step comprises comparing the sensed output related voltage with a second voltage reference.

5. A method as recited in claim 4, wherein the sensing step further comprises:
    adjusting the resultant voltage in accordance with the clock frequency to obtain an adjusted resultant current; and
    applying the adjusted resultant current to charge a capacitor.

6. A method as recited in claim 5, wherein the voltage on the capacitor is related to the output voltage and the inductor is reconnected to the common potential when the output related voltage exceeds the second voltage reference.

7. A method as recited in claim 5, further comprising the step of discharging the capacitor when the inductor is connected between the common potential and the output.

8. A regulator circuit for step-up and step down operation having an input connectable to a power source and an output connectable to a load, the regulator circuit comprising:
    an inductor;
    a first switch connected between a first inductor terminal and an input terminal;
    a second switch connected between the first inductor terminal and a common connection;
    an inductor current sensing element;
    a control circuit responsive to current in the inductor and voltage at the output for controlling activation and deactivation of the switches to regulate voltage at the output to a preset voltage; and
    a comparator having a first input configured to receive a voltage related to the voltage at the output when the first switch is in an on state and the second switch is in an off state, a second input for receiving a voltage reference; and an output connected to the control circuit;
    wherein, in response to the output related voltage exceeding the reference voltage, the first switch is turned off and the second switch is turned on to connect the inductor between the common potential and the output, thereby providing protection during low output voltage conditions during buck mode operation.

9. A regulator circuit as recited in claim 8, further comprising a capacitor configured to be charged by a current related to the output voltage, the voltage across the capacitor applied to the first comparator input.

10. A regulator circuit as recited in claim 9, wherein the capacitor is discharged when the first switch is in an off state.

11. A method for protecting a step-up/step-down regulator circuit during boost mode operation at a constant clock frequency in which a preset voltage at an output is greater than voltage at an input, the method comprising:
    connecting an inductor between the input and a common potential in response to each clock signal pulse received;
    sensing current in the inductor when it is connected to the common potential;
    in response to the sensed inductor current rising to a current peak threshold level, connecting the inductor between the input and the output;
    sensing a voltage related to the voltage at the output when the inductor is connected between the input and the output; and
    connecting the inductor between the common potential and the output prior to a next clock signal pulse in response to occurrence of an output voltage condition during the voltage sensing step.

12. A method as recited in claim 11, wherein the output voltage condition is a low voltage level.

13. A method as recited in claim 11, wherein the output voltage condition is a short circuit.

14. A method as recited in claim 11, wherein
    the sensing step comprises subtracting an output feedback voltage from a first voltage reference to obtain a resultant voltage; and
    the inductor is connected between the common potential and the output when the sensed output related voltage exceeds a second voltage reference.

15. A method as recited in claim 14, wherein the sensing step further comprises:
    adjusting the resultant voltage in accordance with the clock frequency to obtain an adjusted resultant current; and
    applying the adjusted resultant current to charge a capacitor.

16. A method as recited in claim 15, wherein the voltage at the capacitor is the output related voltage and the inductor is reconnected to the common potential when the output related voltage exceeds the second voltage reference.

17. A method as recited in claim 15, further comprising the step of discharging the capacitor when the inductor is connected between the common potential and the output.

18. A regulator circuit for step-up and step down operation having an input connectable to a power source and an output connectable to a load, the regulator circuit comprising:
    an inductor;
    a first switch connected between a first inductor terminal and an input terminal;
    a second switch connected between the first inductor terminal and a common connection;
    a third switch connected between the second inductor terminal and the common connection;
    a fourth switch connected between the second inductor terminal and an output terminal;

a control circuit responsive to current in the inductor and voltage at the output for controlling activation and deactivation of the switches to regulate voltage at the output to a preset voltage; and a comparator having a first input configured to receive a voltage related to the voltage at the output when the first switch and the fourth switch are in an on state, a second input for receiving a voltage reference; and an output connected to the control circuit;

wherein, in response to the output related voltage exceeding the reference voltage, the first switch is turned off and the second switch is turned on to connect the inductor between the common potential and the output so as to control the current in the inductor, thereby providing protection during low output voltage conditions during boost mode operation.

19. A regulator circuit as recited in claim 18, further comprising a capacitor configured to be charged by a current related to the output voltage, the voltage across the capacitor applied to the first comparator input.

20. A regulator circuit as recited in claim 18, wherein the capacitor is discharged when the first switch is in an off state.

21. A method for protecting a step-up/step-down regulator circuit during buck mode operation at a constant clock frequency in which a preset voltage at an output is less than voltage at an input, the method comprising:

connecting an inductor between a common potential and the output in response to a received clock signal pulse;

sensing current in the inductor when it is connected to the common potential;

in response to the sensed inductor current falling to a current valley threshold level, connecting the inductor between the input and the output; and limiting the time during a clock cycle in which the inductor is connected to the input.

22. A method as recited in claim 21, wherein said limiting step comprises:

sensing a voltage level related to the regulator duty cycle and switching frequency;

comparing the sensed voltage level with a reference voltage while the inductor is connected between the input and the output; and in response to the sensed voltage level exceeding the reference voltage, reconnecting the inductor between the common potential and the output.

23. A method as recited in claim 22, wherein the limiting step further comprises:

applying the duty cycle related voltage to charge a capacitor when the inductor is connected to the input; and discharging the capacitor when the inductor is not connected to the input.

24. A regulator circuit for step-up and step down operation at constant frequency having an input connectable to a power source and an output connectable to a load, the regulator circuit comprising:

an inductor;

a first switch connected between a first inductor terminal and an input terminal;

a second switch connected between the first inductor terminal and a common connection;

an inductor current sensing element;

a control circuit responsive to current in the inductor and voltage at the output for controlling activation and deactivation of the switches to regulate voltage at the output to a preset voltage; and a comparator having a first input configured to receive a voltage related to regulator duty cycle and switching frequency, a second input for receiving a voltage reference; and an output connected to the control circuit;

wherein, in response to the voltage at the first comparator input exceeding the reference voltage, the first switch is turned off and the second switch is turned on to connect the inductor between the common potential and the output, thereby providing protection during buck operation.

25. A regulator circuit as recited in claim 24, further comprising a capacitor configured to be charged by a current related to regulator duty cycle and switching frequency, the voltage across the capacitor applied to the first comparator input.

26. A regulator circuit as recited in claim 25, wherein the capacitor is discharged when the first switch is in an off state.

* * * * *